(12) United States Patent
Fukushima et al.

(10) Patent No.: US 8,262,957 B2
(45) Date of Patent: Sep. 11, 2012

(54) CERAMIC POROUS BODY WITH COMMUNICATION MACROPORES AND PROCESS FOR PRODUCING THE CERAMIC POROUS BODY

(75) Inventors: Manabu Fukushima, Aichi (JP); Masayuki Nakata, Aichi (JP); Yuichi Yoshizawa, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 217 days.

(21) Appl. No.: 12/527,924

(22) PCT Filed: Feb. 20, 2008

(86) PCT No.: PCT/JP2008/052846
§ 371 (c)(1),
(2), (4) Date: Dec. 3, 2009

(87) PCT Pub. No.: WO2008/102801
PCT Pub. Date: Aug. 28, 2008

(65) Prior Publication Data
US 2010/0099547 A1    Apr. 22, 2010

(30) Foreign Application Priority Data
Feb. 21, 2007    (JP) .................. 2007-041513

(51) Int. Cl.
*B29C 65/00*    (2006.01)
*C04B 38/00*    (2006.01)
(52) U.S. Cl. ............... 264/42; 264/41; 264/44; 501/80; 501/85
(58) Field of Classification Search ............ 264/28, 264/41, 42, 44, 621; 501/39, 80, 85
See application file for complete search history.

(56) References Cited

U.S. PATENT DOCUMENTS
4,963,145 A * 10/1990 Takagi et al. ............ 606/76
(Continued)

FOREIGN PATENT DOCUMENTS
JP    H08-59367    3/1996
(Continued)

OTHER PUBLICATIONS

Statham et al. Net-Shape Manfuacture of Low-Cost Ceramic Shapes by Freeze-Gelation. Journal of Sol-Gel Science and Technology 13, 171-175 (1998).*

(Continued)

*Primary Examiner* — Noah Wiese
(74) *Attorney, Agent, or Firm* — Suzannah K. Sundby, Esq.; Smith, Gambrell & Russell, LLP (57) ABSTRACT

The present invention is a method for producing a ceramic porous body with high porosity and continuous macropores, which comprises mixing a ceramic powder with an aqueous solution of a gelable water-soluble polymer to form a slurry, gelling for a while to fix the tissue structure, freezing it to produce ice crystals in the gel tissue and creating structures that become continuous pores, thawing the ice by controlled atmospheric substitution-type drying method with the resulting water being replaced without damaging the gel, and then sintering it to produce a ceramic porous body having various porosities, pore diameters and pore shapes, while conventionally cracks and contraction were likely to occur during drying when the solids concentration of the slurry is less than 20 vol %, with the method of the present invention it is possible to control these problems even at a solids concentration of 10 vol % or less, manufacture and provide a ceramic porous body with a porosity of 72% to 99% and a compression strength of 0.4 MPa or more.

16 Claims, 11 Drawing Sheets

U.S. PATENT DOCUMENTS 5,668,188 A * 9/1997 Whinnery et al. ............ 423/345
6,811,602 B2 * 11/2004 Beppu et al. .................. 106/600

FOREIGN PATENT DOCUMENTS

| JP | H10-87378 | 4/1998 |
| JP | H11-506806 | 6/1999 |
| JP | H11-262907 | 9/1999 |
| JP | H11-322465 | 11/1999 |
| JP | H11-322467 | 11/1999 |
| JP | 2001-192280 | 7/2001 |
| JP | 2001-316185 | 11/2001 |
| JP | 2004-129552 | 4/2004 |
| JP | 2004-201594 | 7/2004 |
| WO | WO 96/41030 | 12/1996 |

OTHER PUBLICATIONS

Nakata (2008) "Fabrication of Porous Alumina Sintered Bodies by a Gelate-Freezing Method" Journal of the Ceramic Society of Japan,113:712-715.

ISR mailed Apr. 22, 2008 in PCT/JP2008/052846.

* cited by examiner

CERAMIC POROUS BODY WITH COMMUNICATION MACROPORES AND PROCESS FOR PRODUCING THE CERAMIC POROUS BODY

This application is a 371 national stage application of PCT/JP2008/052846, filed 20 Feb. 2008. This application claims the benefit of PCT/JP2008/052846, filed 20 Feb. 2008, and JP 2007-041513, filed 21 Feb. 2007, both of which are herein incorporated by reference in their entirety.

TECHNICAL FIELD

The present invention relates to a ceramic porous body with communication macropores and a production method therefor, and relates more specifically to a ceramic porous body obtained by gelling, freezing, thawing, drying and sintering a slurry comprising ceramic powder dispersed in an aqueous solution of a gelable water-soluble polymer; and this ceramic porous body has 10 μm to 300 μm communication macropores and a porosity of 72% to 99% and is formed in use of 0.01 μm to 5 μm ceramic powder by gelling and freezing a slurry to thereby form a frozen body having a tissue structure of ice crystals developed by water freezing and other ice crystals which is then maintained intact through thawing, drying and sintering processes, and to a production method therefor.

BACKGROUND ART

Various methods have been proposed in the past for producing a ceramic porous body having communication macropores. Some of these methods involve (1) partial binding of a ceramic material, such as a method of coating ceramic particles with a binder, molding and then sintering them together with pores remaining between the particles (Patent Document 1) and a method of joining particles by sintering the contact points (Patent Document 2). Methods involving (2) removal of components in the ceramic include a method of creating pores by heating and breaking down a premixed component so that it vaporizes and is expelled outside the system (Patent Document 3), and a method of creating pores by using chemical treatment to dissolve a specific component in a composite solid (Patent Document 4).

However, in these methods the strength is said to be poor because it is difficult to control the diameter and distribution of the pores, and difficult to produce a porous body with high porosity. There are also (3) methods using gas, such as a method in which a ceramic slurry is agitated and foamed with a foaming agent (Patent Document 5) and a method in which a ceramic slurry is mixed with hollow spheres that are then removed by baking (Patent Document 6). Extremely high porosity can be obtained by using these methods to produce continuous pores, but high strength is still difficult to obtain.

Other methods use (4) soft urethane foam with a continuous bubble structure, including a method in which urethane foam is impregnated with a ceramic slip and burnt to remove the soft urethane (Patent Document 7). In this method there is a risk that cracks will occur in the ceramic framework due to the large amounts of gas produced.

Methods using (5) ice have also been proposed, such as a method of producing a ceramic porous body by freezing water. That is, in this method a ceramic porous body having a highly oriented composite porous structure is produced by cooling a water-based slurry in a mold from the bottom of the mold to thereby grow ice crystals in a single direction, and sublimating the water by freeze-drying (Patent Document 8).

Although this method is revolutionary, the pores are oriented in a single axial direction, with little degree of freedom in controlling the pore shape, and since the frozen molded body is composed of powder and ice, it is extremely difficult to handle after freezing and drying if it is a highly porous body, and it is difficult to obtain a highly porous body without cracks.

The inventors in this case have already published a technical paper relating to a Gelate Freezing Method (Non-patent Document 1). According to this paper, it is possible to produce a ceramic porous body with continuous macropores by drying using the gelate freezing method. However, with the technique of this paper, when a slurry with a solids concentration of less than 28 vol % is used in order to obtain a porous body with a porosity of over 72%, cracks occur due to differences in drying contraction between the inside and outside of the molded body during drying, and it is impossible to obtain a highly porous body without cracks.

Patent Document 1: Japanese Patent Application Laid-open No. 2004-129552
Patent Document 2: Japanese Translation of PCT Application No. H11-506806
Patent Document 3: Japanese Patent Application Laid-open No. H11-322465
Patent Document 4: Japanese Patent Application Laid-open No. H10-87378
Patent Document 5: Japanese Patent Application Laid-open No. 2004-201594
Patent Document 6: Japanese Patent Application Laid-open No. H8-59367
Patent Document 7: Japanese Patent Application Laid-open No. H11-322467
Patent Document 8: Japanese Patent Application Laid-open No. 2001-192280
Non-patent Document 1: Journal of the Ceramic Society of Japan, 113, (2005) 712-715

Under these circumstances, and in light of the aforementioned prior art, the authors in this case succeeded, as a result of exhaustive research aimed at developing a novel ceramic porous body production method whereby a ceramic porous body with a porosity of 72% to 99% and continuous pores 10 μm to 300 μm in diameter could be produced by methods that would control the shape of the pores and provide both high porosity and macropores in a strong molded body with excellent handling properties, in applying the aforementioned "Gelate Freezing Method" to high porosity for the first time, and in constructing a new technique that combines "controlled atmospheric substitution-type drying method" by means of vacuum drying, humidity-controlled drying, or immersion in a water-soluble organic solvent and air-drying in the thawing and drying steps to thereby achieve a high porosity rate and produce a porous body with continuous macropores which is even suited to ceramic slurries with a solids concentration of less than 28 vol %.

DISCLOSURE OF THE INVENTION

It is an object of the present invention to provide a method for producing ceramic porous bodies with a variety of porosities, pore diameters, pore shapes and member shapes by means of a novel method that combines "Gelate Freezing Method" in which a ceramic powder is mixed with an aqueous solution of a gelable water-soluble polymer to produce a slurry, which is then gelled for a while to fix the texture, and then frozen to produce ice crystals inside the gel texture and thereby form a tissue structure of continuous pores, and "controlled atmospheric substitution-type drying method", in which when the ice crystals are converted into pores in the process of thawing and drying the resulting frozen body, and the difference of the dryness between the inside and outside is controlled so as to prevent cracks in the molded body by vacuum drying or humidity-controlled drying the frozen body or immersing it in a water-soluble organic solvent and air drying it so that pores are gradually substituted for the ice, along with a ceramic porous body and member.

To solve the aforementioned problems, the present invention consists of the following technical means.

(1) A method for producing a ceramic porous body by gelling, freezing, thawing, drying and sintering a slurry of ceramic powder dispersed in an aqueous solution of a gelable water-soluble polymer characterized by comprising: using 0.01 μm to 5 μm ceramic powder, forming, by gelling and freezing a slurry, a frozen body having a tissue structure of ice crystals produced by freezing of water released from the polymer, and then maintaining this structure intact through thawing, drying and sintering processes to prepare a ceramic porous body having continuous macropores 10 μm to 300 μm in diameter and a porosity of 72% to 99%.

(2) The method for producing a ceramic porous body according to (1) above, wherein in the thawing and drying processes, drying is accomplished by means of controlled atmospheric substitution-type drying method, in which the frozen body is subjected to vacuum drying or controlled-humidity drying or immersed in a water-soluble organic solvent and then air dried so that the difference of the dryness between inside and outside is controlled and the ice is gradually replaced by pores, whereby a molded body without cracks is obtained.

(3) The method for producing a ceramic porous body according to (1) above, wherein an irreversible gelable polymer that does not return to a pre-frozen tissue structure during the thawing process is used as the gelable water-soluble polymer.

(4) The method for producing a ceramic porous body according to (1) above, wherein a N-alkyl acrylamide polymer, N-isopropyl acrylamide polymer, sulfomethylated acrylamide polymer, N-dimethylaminopropyl methacrylamide polymer or polyalkyl acrylamide polymer or alginic acid, polyethyleneimine, starch, carboxymethyl cellulose, gelatin, hydroxymethyl cellulose, polyacrylic acid sodium, polyvinyl alcohol, polyethylene glycol, agar or polyethylene oxide is used as the gelable water-soluble polymer.

(5) The method for producing a ceramic porous body according to (1) above, wherein a slurry with a ceramic powder solids concentration of 1 vol % to 28 vol % is used as the slurry of dispersed ceramic powder.

(6) The method for producing a ceramic porous body according to (1) above, wherein alumina, zirconia, silicon carbide, silicon nitride, cordierite or hydroxyapatite is used as the ceramic raw material.

(7) The method for producing a ceramic porous body according to (1) above, wherein the gelled slurry is frozen at a freezing temperature below −10° C.

(8) The method for producing a ceramic porous body according to (1) above, wherein an organic solvent is substituted for the part that was ice in the frozen body by multiple repetitions of a thawing operation in which water is replaced with organic solvent by immersing the frozen body in a water-soluble organic solvent.

(9) The method for producing a ceramic porous body according to (1) above, wherein a thawed body with organic solvent substituted in the internal spaces is dried to obtain a molded body without cracks.

(10) A ceramic porous body having a pore shape formed by substituting pores for ice crystal parts in a frozen water-based slurry of dispersed ceramic powder, characterized by having a mean aspect ratio of the pores of at least 1.5, containing no pores with a branching structure (dendrite structure), having a compressive strength of at least 0.4 Mpa, having no closed pores, having continuous pores with a pore diameter of 10 μm to 300 μm, and having a high porosity of 72% to 99%.

(11) The ceramic porous body according to (10) above, wherein the ceramic is alumina, zirconia, silicon carbide, silicon nitride, cordierite or hydroxyapatite.

(12) A ceramic porous body member characterized by comprising the ceramic porous body defined in (10) or (11) above.

The present invention is next explained in detail.

In the present invention, a ceramic porous body having a high porosity of 72% to 99% and continuous macropores 10 μm to 300 μm in diameter, which was difficult to achieve in the past, is prepared by a ceramic porous body production method in which a slurry consisting of ceramic powder dispersed in an aqueous solution of a gelable water-soluble polymer is gelled, frozen, thawed, dried and sintered, wherein using a 0.01 μm to 5 μm ceramic powder, a frozen body having a tissue structure of ice crystals developed by freezing of water released by the polymer is formed and maintained intact through the freezing, drying and sintering processes.

In the method of the present invention, a ceramic porous body having a dense matrix part, large pore diameters and continuous pores is prepared by means of freezing, thawing, drying, degreasing and sintering processes using a ceramic powder and a gelable water-soluble polymer by combining a gel casting method and freezing method in a method for preparing a ceramic porous body by freeze separation (frozen concentration). During these processes, when the gelled slurry is frozen water is released from the polymer during freezing, ice crystals grow and a tissue structure of ice crystals forms, resulting in a frozen body consisting of an ice crystal part and a part comprising the ceramic powder and gelled aqueous polymer solution. In order to prevent cracks in the molded body in this process, it is dried by "controlled atmospheric substitution-type drying method" in which the difference of the dryness between the inside and outside of the molded body is controlled as pores are gradually substituted for the ice, after which the polymer is degreased and the molded body is sintered after degreasing to prepare the aforementioned ceramic porous body.

An irreversible gelable polymer that does not reassume its pre-freezing tissue structure during the thawing process is used as the gelable water-soluble polymer, and specific examples include N-alkyl acrylamide polymers, N-isopropyl acrylamide polymers, sulfomethylated acrylamide polymers, N-dimethylaminopropyl methacrylamide polymers, polyalkyl acrylamide polymers, alginic acid, polyethyleneimine, starch, carboxymethyl cellulose, gelatin, hydroxymethyl cellulose, polyacrylic acid sodium, polyvinyl alcohol, polyethylene glycol, agar and polyethylene oxide.

A necessary condition for the water-soluble polymer in the gelate freezing method is that after gelling it becomes an irreversible gel that does not return to liquid form in the thawing and drying steps, but as long as such a polymer is used it is not limited to those listed above. A desirable condition for the solids concentration of the slurry is that it is a concentration at which ice crystals grow during freezing. The concentration of the water-soluble polymer is preferably 0.5 vol % to 20 vol %. Gelling requires a polymerization initiator, and examples include diglycerol glycidyl ether, N,N'-methylene bisacrylamide and the like.

Examples of ceramic powders that can be used include alumina, zirconia, silicon carbide, silicon nitride, cordierite, hydroxyapatite and the like. The particle diameter of these raw material powders is preferably about 0.01 μm to 5 μm. 0.1 μm to 1 μm is especially preferred. The present invention is applicable to all kinds of ceramics as long as they are sinterable, and the type of raw material powder is not particularly limited.

The solids concentration of the ceramic powder in the slurry is preferably in the range of 1 vol % to 28 vol %. Below 1 vol % it is difficult to maintain the shape during drying, and difficult to prepare a ceramic porous body. A concentration above 20 vol % results in a low porosity of 72% or less, while a concentration above 50 vol % not only results in a low porosity of 50% or less but also in far fewer ice crystals produced by freezing, eliminating the benefits of using the gelate freezing method.

In the gelate freezing method, "gelling" means that the slurry of dispersed ceramic particles is solidified for a while by gelling to produce a uniform and stable structure. This is then converted into a ceramic porous body through the processes of freezing, thawing, drying, degreasing and sintering. To this end, it is desirable that the gelled slurry be a gel that adapts to dimensional changes during cooling and responds stably so that the ice crystal structure can be altered during freezing. In order to obtain a highly porous body with a porosity of 72% or more in particular, the gel must be stable in response to dimensional changes during cooling. In the present invention, various known cooling methods can be used for the freezing process, and the pore diameter and pore shape can be controlled at will by altering the crystal structure of the ice.

The cooling method can be varied by means of the cooling temperature, cooling site, cooling direction, heat transfer method and the like, and a variety of cooling methods can be used, including specifically cooling by contact heat transfer from the bottom or top surface, cooling by radiant heat transfer from the sides with the top and bottom surfaces insulated with a heat insulating material, cooling by radiant heat transfer from the entire circumference with the hollow mold floating on a cooling liquid in which it is immersed together with the gel, or rapid cooling, slow cooling or the like, and either one or multiple known cooling methods can be applied as long as the intent of the invention is not violated.

The reason that such a variety of cooling methods are applicable is that, as discussed above, the gelled slurry is in an extremely stable state with respect to dimensional changes, time changes, handling and other kinetic changes, and can provide a structure without cracks after freezing. Because some types of water-soluble polymer do not freeze at $-10°$ C. or above, a freezing temperature of $-10°$ C. or less is preferred.

In order to obtain a highly porous molded body without cracks in the present invention, a thawing method was used employing "controlled atmospheric substitution-type drying method" in which the ice crystal part was removed by a process such as vacuum high-temperature rapid drying, rapid sublimation of the ice by freeze-drying, humidity-controlled drying, substitution of a solvent for ice or water or the like, or in other words a method of drying and thawing by substitution of atmosphere for the ice in the frozen gel. When vacuum drying or freeze-drying is used, the ice crystals in the frozen gel sublimate, leaving fine pores. When humidity-controlled drying is used, the ice melts and is converted to steam under specific steam pressure conditions. When the gel is immersed in an organic solvent or water solution, the ice melts as it is replaced with the water or solvent, and becomes mixed with the water or solvent. For example, the part that was ice in the frozen gel is replaced with organic solvent by repeated operations of thawing and drying in which the frozen gel is immersed in an organic solvent, which is substituted for the water.

The organic solvent is one that does not corrode the water-soluble polymer, and is preferably more volatile than water. Specific examples include ethanol, methanol, isopropyl alcohol, acetone, ethyl acetate and the like, but the type is not particularly limited. One of these can be used alone, or multiple types can be used in combination in repeated drying operations by which the part that was ice in the frozen gel is replaced with atmosphere as discussed above, becoming pores within the resulting molded body. If one of these thawing methods is not used, cracks will occur in the molded body when producing a porous body with a slurry solids concentration of less than 28 vol % or in other words with a high porosity of over 72%.

Next, the thawed body having atmosphere substituted in all the internal hollow spaces is gradually dried in atmosphere. In vacuum high-temperature drying, freeze drying, humidity-controlled drying, solvent-ice substitution and other controlled atmospheric substitution-type drying methods, the difference in drying speed between the inside and outside of the thawed body is moderated, and defects due to difference in drying contraction between the inside and outside are greatly reduced. Thus, thawing and drying are important processes in the present invention for purposes of retaining the ice crystals in the porous bodies in the form of macropores, and obtaining a molded body without cracks and with good handling properties.

In order to manufacture a porous body with low porosity using current technology it is enough to use a slurry with a high solids concentration, and since there is relatively more gel part, the resulting molded body is strong. The drying process is relatively easy, and a porous body without cracks is obtained by widely-used drying methods. Consequently, dimensional changes can be tolerated and a porous body without cracks can be easily obtained even after thawing and drying at atmospheric pressure and room temperature. However, when thawing and drying members with high porosity of over 72%, with a variety of pores and with large and complex shapes, it is difficult to obtain a molded body without cracks except by using "controlled atmospheric substitution-type drying method".

Post-drying degreasing is preferably performed under conditions of about $700°$ C., 2 hours degreasing time when using an acrylamide polymer. When using other widely-used polymers, degreasing temperatures between $300°$ C. and $900°$ C. are applied. Degreasing is preferably performed in an argon, nitrogen or other inactive gas atmosphere when the raw material is a non-oxide ceramic such as silicon carbide or silicon nitride, and in air when the raw material is an oxide ceramic such as alumina, zirconia or apatite. In the sintering process, the temperature, time and atmosphere are adjusted appropriately according to the ceramic powder used and the desired porosity and pore structure.

In the present invention, it is possible for example to prepare an alumina porous body with a slurry solids concentration of 11 vol % and a porosity of 73%, a silicon carbide porous body with a slurry solids concentration of 11 vol % and a porosity of 86%, or a silicon carbide porous body with a slurry solids concentration of 6 vol % and a porosity of 93%. In this case, the matrix part of the resulting ceramic porous body is stronger and denser than in the case of a conventional porous body, while in comparison with porous bodies prepared by conventional methods, the pore part has a unique pore shape resulting from substitution of air for an ice crystal structure consisting of large pores, continuous pores and a variety of pore shapes.

In the ceramic porous body of the present invention, the pores have a mean aspect ratio of 1.5 or more, with no pores having branched (dendrite structure) structures, the compression strength is 0.4 MPa or more, there are no closed pores but continuous pores with a pore diameter of 10 μm to 300 μm, and the porosity is high, 72% to 99%.

The present invention provides the following effects.
(1) Air is substituted as is for an ice crystal structure to provide a ceramic porous body having continuous 10 μm to 300 μm pores consisting of large pore diameters, continuous pores and a variety of pore shapes, with a porosity of 72% to 99% and a compression strength of 0.4 MPa or more.
(2) It is possible to provide a porous body of alumina, zirconia, silicon carbide, silicon nitride, cordierite or hydroxyapatite which is a ceramic porous body having good strength and a high porosity of over 72%, something which would be difficult to obtain by conventional methods.
(3) This ceramic porous body can be manufactured by combining the methods of gelate freezing and thawing by "controlled atmospheric substitution-type drying method".
(4) The ceramic porous body of the present invention can be applied to a wide variety of applications, including filters, moisture absorption, water absorption, sound absorption, adsorption, deodorization, health products, diffusion plates, reactors, shock-absorbing materials, light materials, catalyst carriers, solid catalysts, heat insulators, refractory materials, biomaterials, vacuum chucks, electromagnetic wave shields and the like.

BEST MODE FOR CARRYING OUT THE INVENTION

Next, the present invention is explained in detail based on examples, but the present invention is applicable to a variety of ceramic powders, and is not limited to the following examples. The open porosities of the prepared ceramics are shown in Table 1, but the present invention is not limited to these.

Example 1

Figure 1:
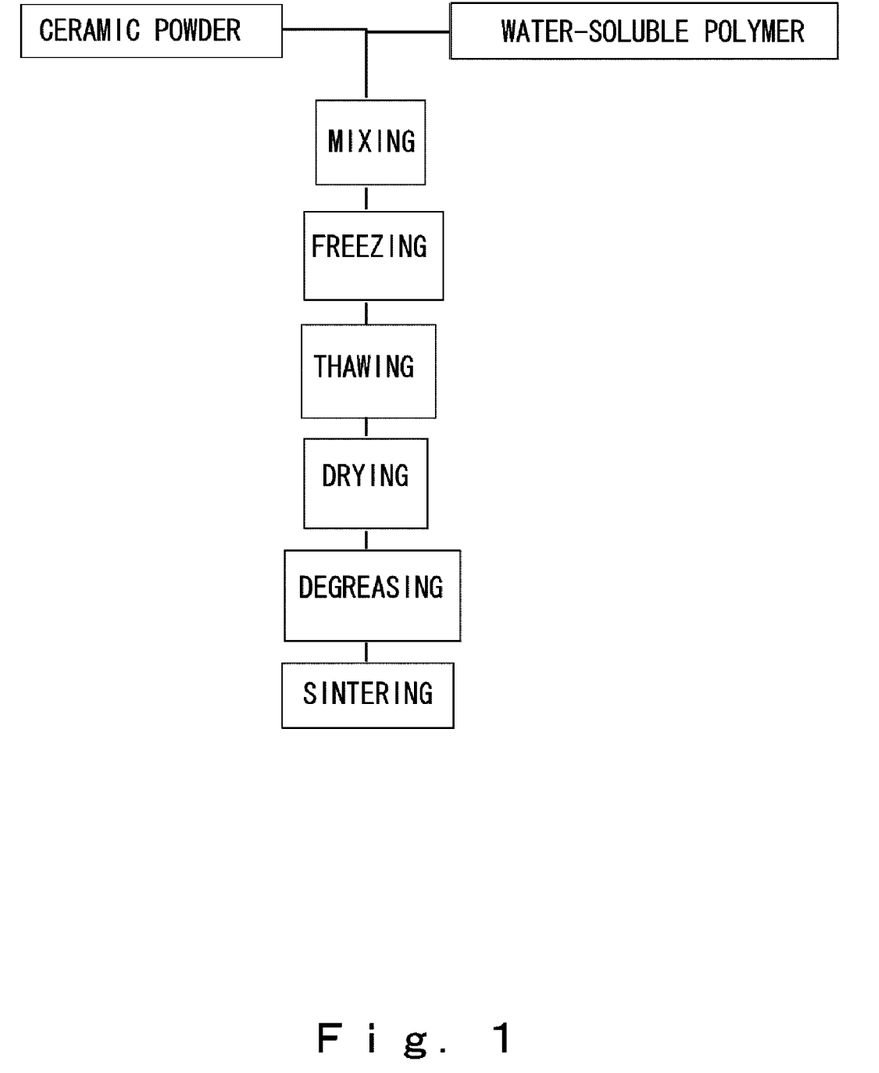
FIG. 1 shows an outline of a method for producing the ceramic porous body of the present invention.
Figure 2:
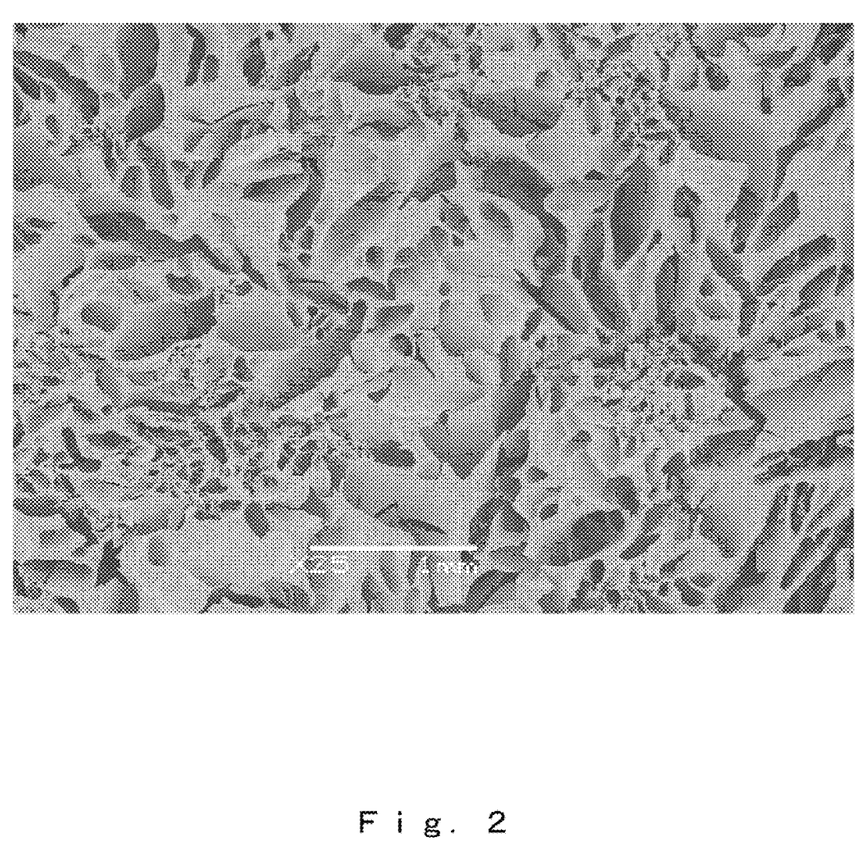
FIG. 2 shows a partial vertical cross-section of the ceramic porous body of Example 1.
Figure 3:
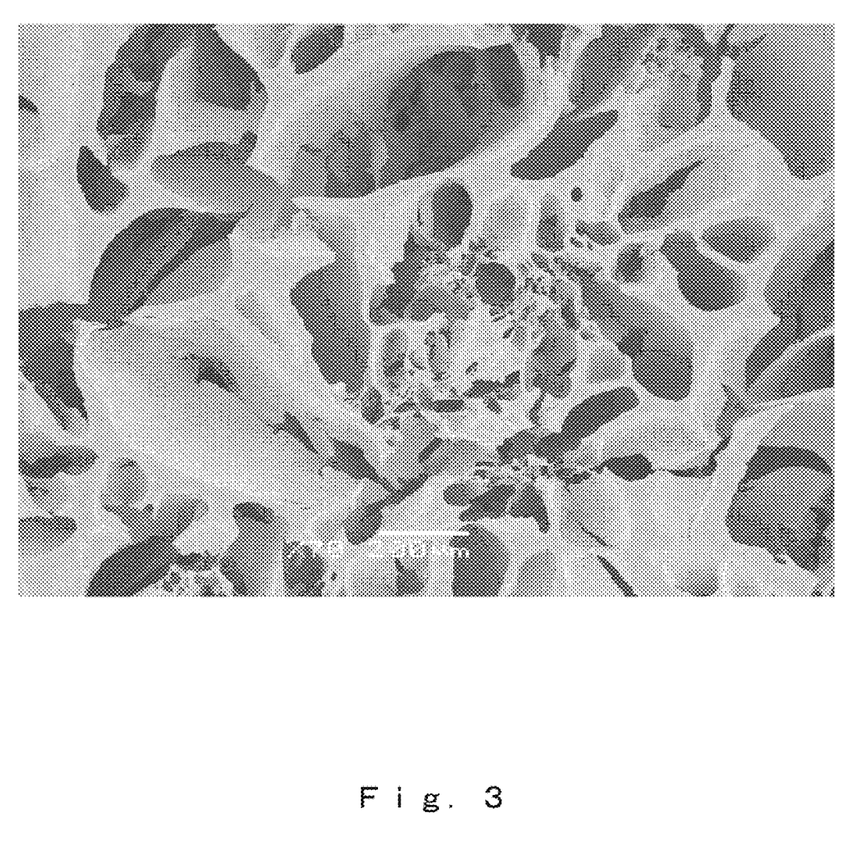
FIG. 3 shows a partial vertical cross-section of the ceramic porous body of Example 1.
Figure 4:
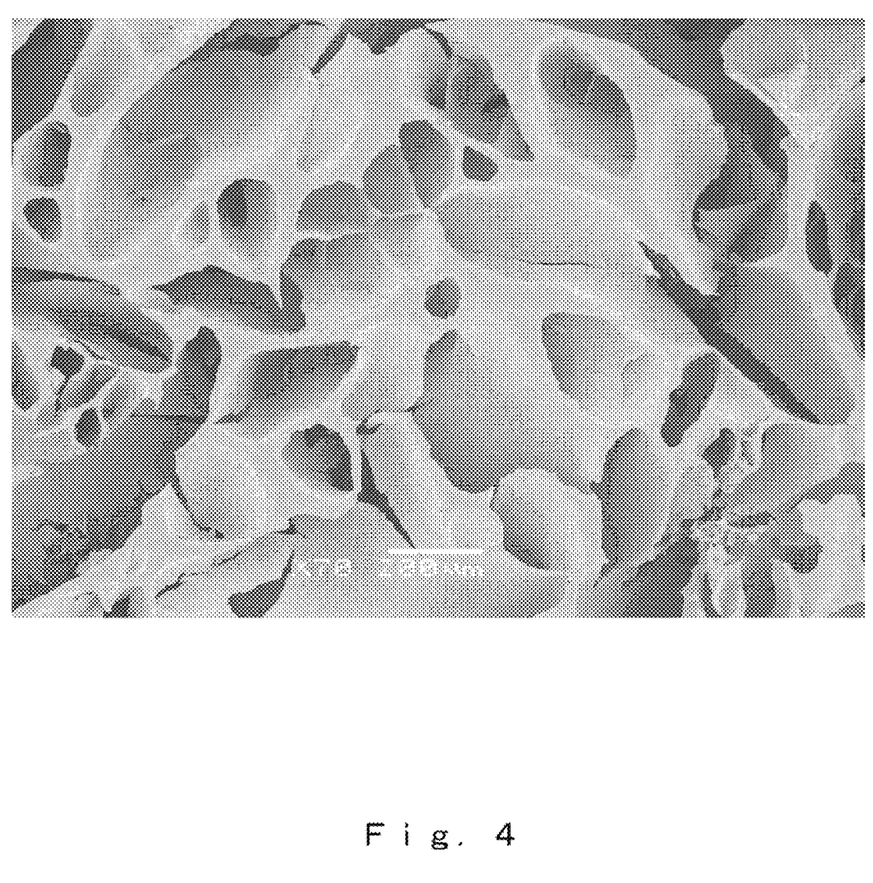
FIG. 4 shows a partial vertical cross-section of the ceramic porous body of Example 1.

11 vol % alumina powder (mean particle size 0.4 μm) was mixed with 84.5 vol % water to prepare a slurry to which were added a water-soluble polymer and crosslinking agent, and the slurry was gelled. Next, a mold filled with the gelled slurry was frozen by cooling in a freezer at −25° C. After freezing, this was dried by controlled atmospheric substitution-type drying method, degreased in a tubular furnace, and sintered for 2 hours at 1600° C. in an electric furnace. The resulting porous body had a porosity of 73%. Porosity was measured by the Archimedes method. FIGS. 2, 3 and 4 show partial vertical cross-sections of the ceramic porous body prepared in this example.

Example 2

Figure 5:
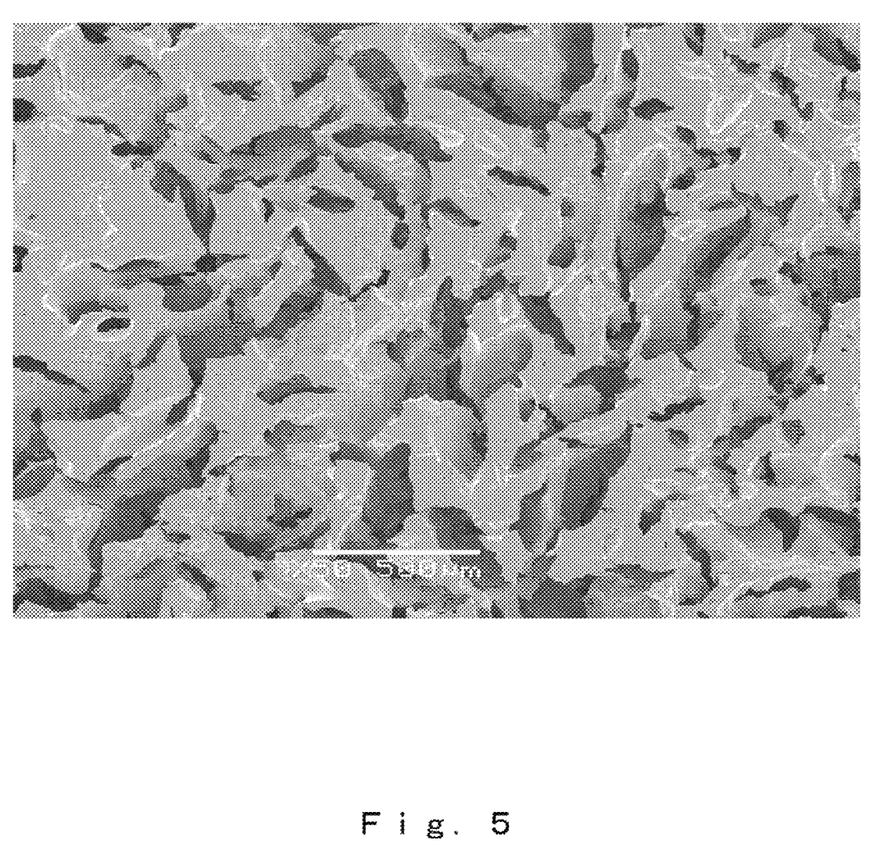
FIG. 5 shows a partial vertical cross-section of the ceramic porous body of Example 2.
Figure 6:
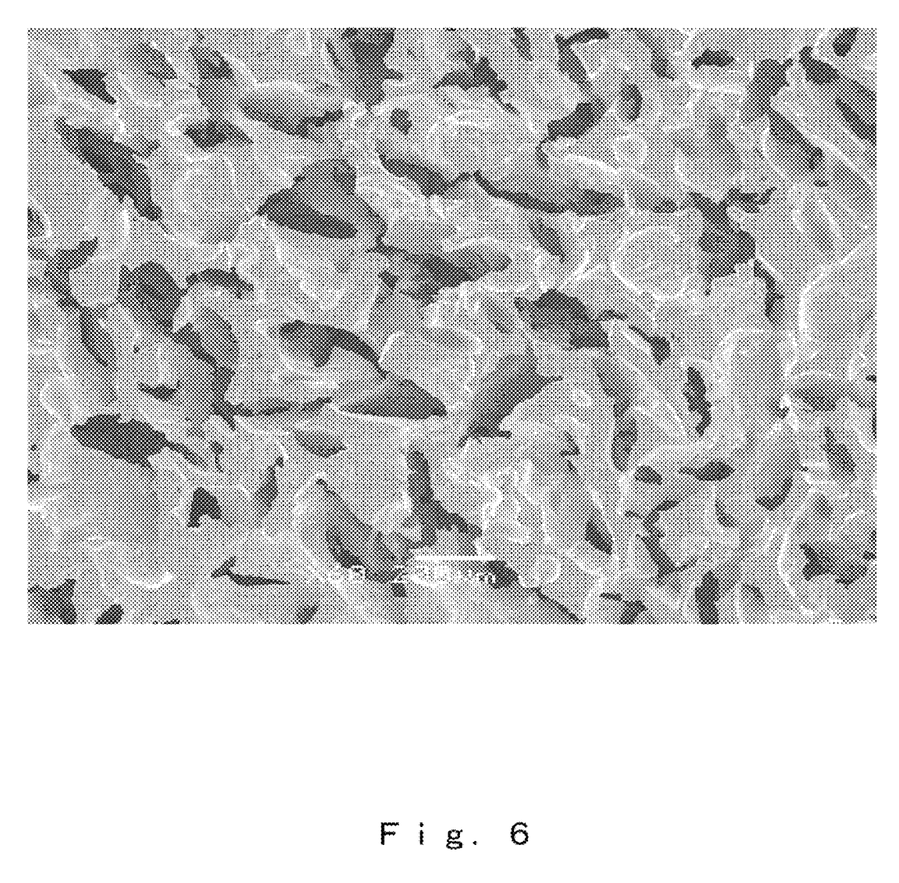
FIG. 6 shows a partial vertical cross-section of the ceramic porous body of Example 2.
Figure 7:
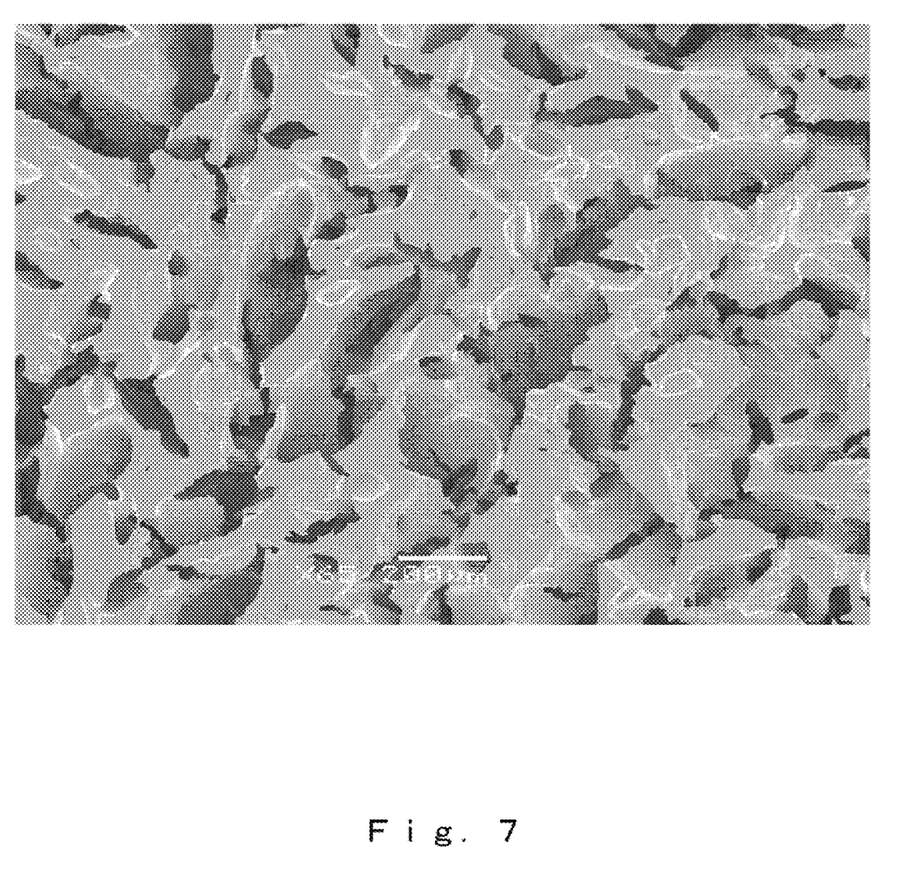
FIG. 7 shows a partial vertical cross-section of the ceramic porous body of Example 2.

11 vol % zirconia powder (specific surface area 16 m²/g) and a sintering aid were mixed with 84.5 vol % water to prepare a slurry to which were added a water-soluble polymer and crosslinking agent, and the slurry was gelled. Next, a mold filled with the gelled slurry was frozen by cooling in a freezer at −25° C. After freezing, this was dried by controlled atmospheric substitution-type drying method, degreased in a tubular furnace, and sintered for 2 hours at 1400° C. in an electric furnace. The resulting porous body had a porosity of 73%. FIGS. 5, 6 and 7 show partial vertical cross-sections of the ceramic porous body prepared in this example.

Example 3

Figure 8:
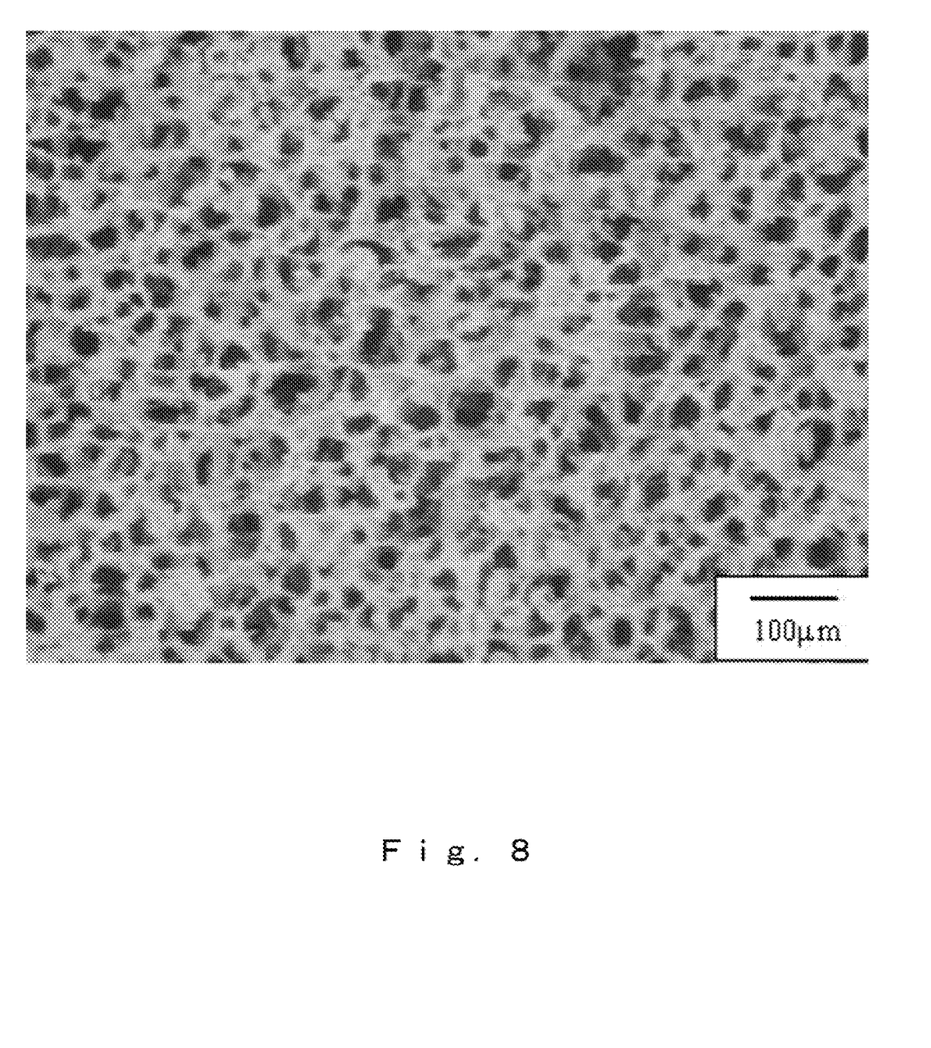
FIG. 8 shows a partial vertical cross-section of the ceramic porous body of Example 3.

6 vol % of silicon carbide powder (mean particle size 0.3 μm) and a sintering aid were mixed with 92.1 vol % water to prepare a slurry to which were added a water-soluble polymer and crosslinking agent, and the slurry was gelled. Next, a mold filled with the gelled slurry was frozen by cooling in a freezer at −55° C. The frozen gel was removed from the mold, thawed in an organic solvent, degreased in argon atmosphere and sintered for 2 hours at 1800° C. The resulting porous body had a porosity of 89%. FIG. 8 shows a partial vertical cross-section of the ceramic body prepared in this example.

Example 4

Silicon carbide powder (Ibiden, Ultrafine) with an average particle diameter of 0.3 μm was used together with a 50 vol % aqueous solution of polyethyleneimine (Sigma). The polyethyleneimine aqueous solution was diluted to 4 vol % for use. The silicon carbide powder and polyethylenimine were mixed for 1 minute in a hybrid mixer (Thinky, AR250) to prepare a silicon carbide slurry. The mixing ratio was 8 vol % of silicon carbide powder to 92 vol % polyethyleneimine aqueous solution. Bubbles were removed from the slurry by vacuum defoaming. Next, crosslinked diglycerol glycidyl ether was added to the slurry, which was then mixed for 30 seconds with a mixing device and poured into a mold. After molding, it was gelled with a hot-air heating device (Yamato, DK400).

After gelling had been confirmed, the gel and mold were cooled together for 1 hour in a freezing tank (Tozai Tsusho, Freezevac 1). The frozen slurry was removed from the mold, dried for 12 hours in a vacuum drier (Tozai Tsusho, Freezevac 2), and then dried by being heated from 30 to 70° C. at a rate of 20° C./h in a hot-air heating device (Yamato, DK400).

In order to remove polyethyleneimine from the dried precursor, it was heated at a rate of 300° C./h in argon atmosphere in a tubular furnace (Koyo, Lindberg), and maintained at 600°

Figure 9:
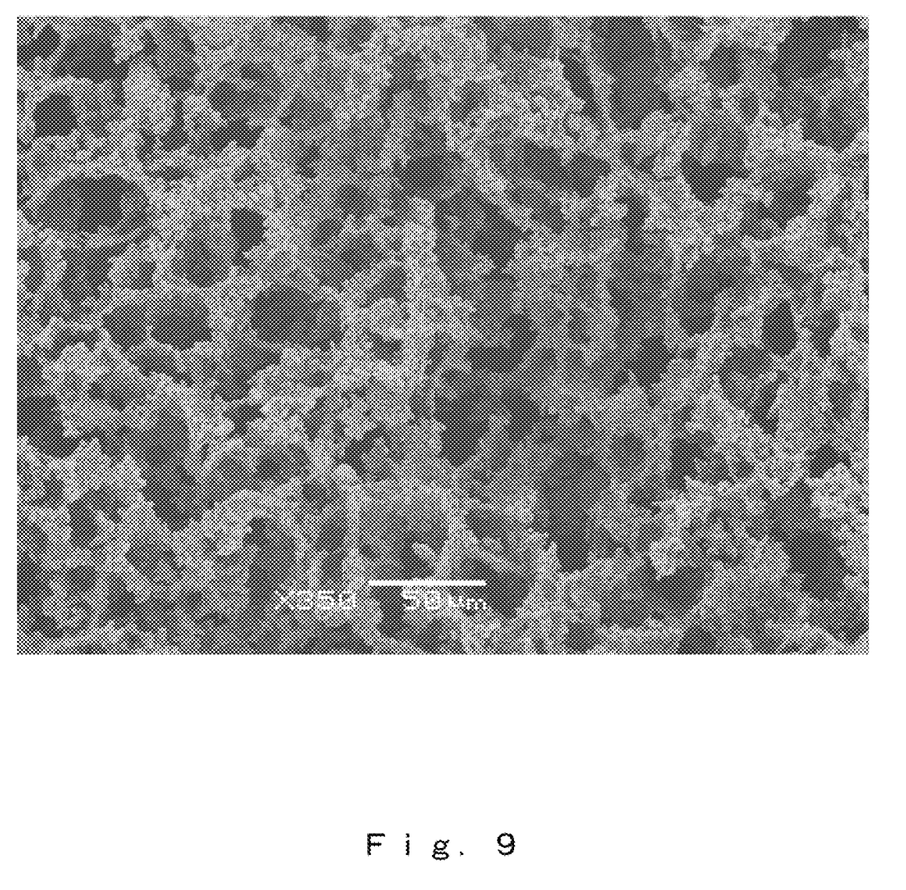
FIG. 9 shows a partial vertical cross-section of the ceramic porous body of Example 4.

C. for 2 hours as a degreasing treatment. After furnace cooling and removal, it was sintered by being heated in an argon atmosphere in an atmospheric furnace (Fuji Dempa Kogyo, Multi 1000) and maintained at 1800° C. for 2 hours. The porosity of the resulting porous body was 90%. FIG. 9 shows a partial vertical cross-section of the ceramic porous body prepared in this example.

Examples of open porosity for sintered bodies prepared according to the present invention are summarized in Table 1.

TABLE 1

| Material | Solid concentration (%) | Atmosphere | Sintering temperature (° C.) | Open porosity (%) |
|---|---|---|---|---|
| SiC | 10 | Ar | 1900 | 88 |
| SiC + $Al_2O_3$ | 10 | Ar | 1900 | 87 |
| SiC + $Al_2O_3$ | 6 | Ar | 1900 | 92 |
| $Al_2O_3$ | 11 | Air | 1600 | 76 |
| $ZrO_2$ | 11 | Air | 1400 | 72 |

As shown in FIGS. 2 to 9, the ceramic porous bodies obtained by the methods of the present invention exhibit a pore structure of continuous macropores without any branching (dendrite structure) structures. Branching (dendrite structure) structures are structures having a dendritic shape of branches extending from a thick trunk. In order to measure the pore diameters and aspect ratios of the resulting ceramic bodies, partial vertical cross-sectional images were subjected to image analysis. The pore cross-sections were approximated as ovals, and the areas, major axes and minor axes were measured.

The pore diameters as calculated from the projected area diameter (the diameter of a circle having the same area as the oval) were 10 μm to 300 μm. The mean aspect ratios (major axis/minor axis) of the pores were 1.5 or more. A silicon carbide porous body with a porosity of 92% that was strong enough to be handled was measured for compression strength with a compression tester (MTS, Sintech 10/GL) at a crosshead speed of 0.5 mm/min. Compression strength was about 0.4 MPa.

Thus, a ceramic porous body prepared using the gelate freezing method is shown to have a fundamentally different pore shape from ceramic porous bodies prepared by other methods, that is, methods involving partial sintering of ceramic powder, methods using pore-forming materials, methods involving mixing of bubbles and methods of freezing ungelled slurries, and to be strong enough to be handled. These findings also illustrate another advantage of the present invention, which is the ability use a variety of different ceramic powders to provide a variety of ceramic porous bodies that are strong enough to be handled while having a high porosity and pore shapes with aspect ratios of 1.5 or more.

Figure 10:
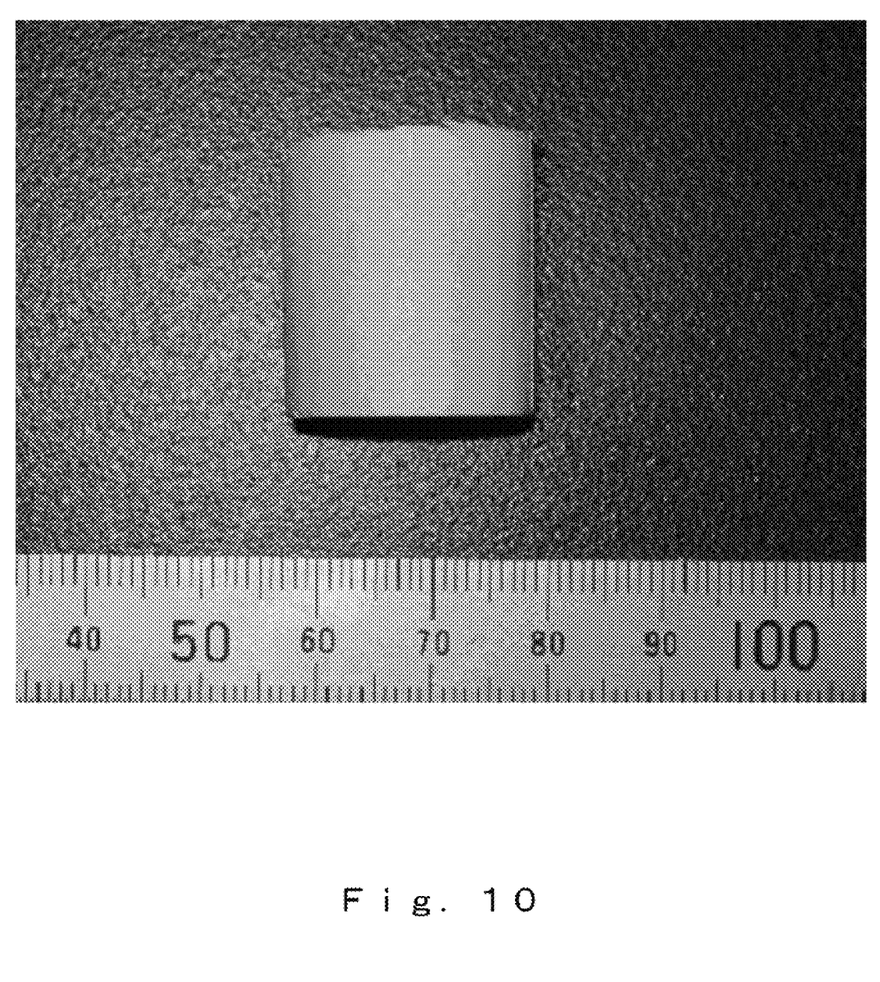
FIG. 10 shows a molded body (photograph) dried by controlled atmospheric substitution-type drying method.
Figure 11:
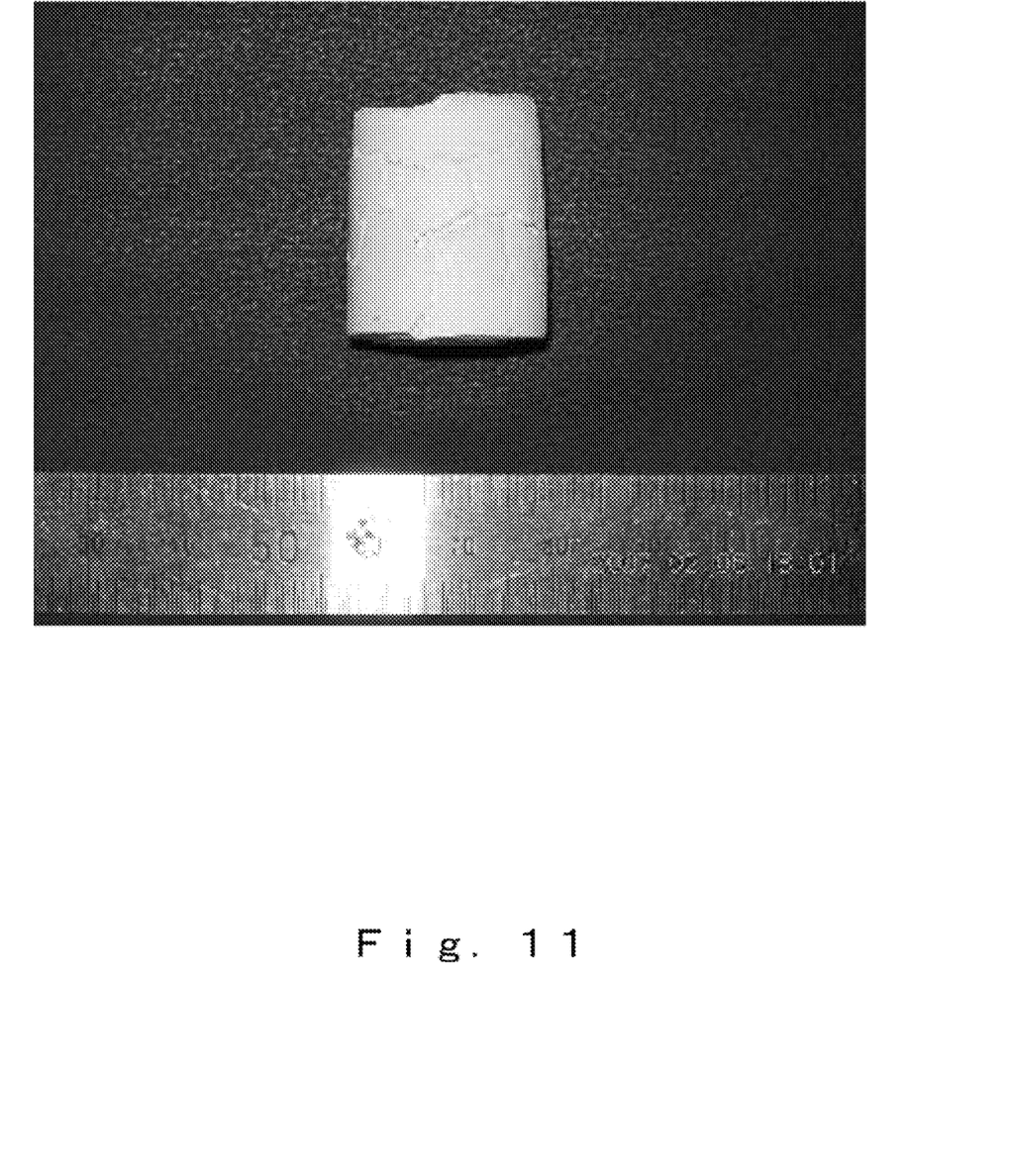
FIG. 11 shows a molded body (photograph) dried by heating alone.

FIG. 10 shows a molded body (photograph) dried by "controlled atmospheric substitution-type drying method" in preparing a highly porous body, while FIG. 11 shows a molded body (photograph) dried using only heat. These figures show that "controlled atmospheric substitution-type drying method" is necessary in order to obtain a large molded body with high porosity.

INDUSTRIAL APPLICABILITY

As explained before, the present invention relates to a ceramic porous body having continuous macropores, and to a method of producing the same, and the ceramic porous body obtained by the present invention provides porosity, pore diameters and pore shapes that have been difficult to achieve with existing technology, and the present invention provides a method for producing a porous body with these advantages without the need for advanced production techniques or large and expensive equipment. Moreover, the present invention is easily applicable to various ceramics including silicon carbide and the like which have been difficult to use in the past, and should be applicable to a wide range of uses including filters, moisture absorption, water absorption, sound absorption, adsorption, deodorization, health products, diffusion plates, reactors, shock-absorbing materials, light materials, catalyst carriers, solid catalysts, heat insulators, refractory materials, biomaterials, vacuum chucks, electromagnetic wave shields and the like.

The invention claimed is:

1. A method for producing a ceramic porous body which comprises forming a slurry of 0.01 μm to 5 μm ceramic raw material powder dispersed in an aqueous solution of a gelable water-soluble polymer, gelling and then freezing the slurry to give a frozen body having a tissue structure of ice crystals formed from water released from the gelable water-soluble polymer, and then maintaining this structure intact through thawing, drying and sintering processes to give a ceramic porous body having continuous macropores of 10 μm to 300 μm in diameter and a porosity of 72% to 99%,
   wherein the gelable water-soluble polymer is an N-alkyl acrylamide polymer, an N-isopropyl acrylamide polymer, a sulfomethylated acrylamide polymer, an N-dimethylaminopropyl methacrylamide polymer, a polyalkyl acrylamide polymer, alginic acid, polyethyleneimine, starch, carboxymethyl cellulose, gelatin, hydroxymethyl cellulose, polyacrylic acid sodium, polyvinyl alcohol, polyethylene glycol, agar, or polyethylene oxide.

2. The method for producing a ceramic porous body according to claim 1, wherein in the thawing and drying processes, drying is accomplished by a controlled atmospheric substitution-type drying method, in which the frozen body is subjected to vacuum drying or controlled-humidity drying or immersed in a water-soluble organic solvent and then air dried so that the difference of the dryness between inside and outside is controlled and the ice crystals are gradually replaced by pores, whereby the ceramic body is obtained without cracks.

3. The method for producing a ceramic porous body according to claim 1, wherein an irreversible gelable polymer that does not return to a pre-frozen tissue structure during the thawing process is used as the gelable water-soluble polymer.

4. The method for producing a ceramic porous body according to claim 1, wherein a slurry with a ceramic powder solids concentration of 1 vol % to 28 vol % is used as the slurry of ceramic raw material powder.

5. The method for producing a ceramic porous body according to claim 1, wherein alumina, zirconia, silicon carbide, silicon nitride, cordierite or hydroxyapatite is used as the ceramic raw material powder.

6. The method for producing a ceramic porous body according to claim 1, wherein the gelled slurry is frozen at a freezing temperature below −10° C.

7. The method for producing a ceramic porous body according to claim 1, wherein a water part derived from ice in the frozen body is substituted with an organic solvent which is water soluble by multiple repetitions of a thawing operation in which the water part is replaced with the organic solvent by immersing the frozen body in the organic solvent to give a thawed body having the organic solvent.

8. The method for producing a ceramic porous body according to claim 7, wherein the thawed body with the organic solvent is dried to obtain the ceramic porous body without cracks.

9. A ceramic porous body having a compressive strength of at least 0.4 Mpa and a high porosity of 72% to 99%, wherein the pores of the ceramic porous body are continuous pores with a pore diameter of 10 μm to 300 μm and a pore shape with a mean aspect ratio of at least 1.5, and said ceramic porous body has no closed pores and no pores with a branching structure (dendrite structure).

10. The ceramic porous body according to claim 9, wherein the ceramic is alumina, zirconia, silicon carbide, silicon nitride, cordierite or hydroxyapatite.

11. A ceramic porous body member which comprises the ceramic porous body defined in claim 9.

12. A ceramic porous body member which comprises the ceramic porous body defined in claim 10.

13. A ceramic porous body made according to the method of claim 1, wherein the ceramic porous body has a compressive strength of at least 0.4 Mpa and a high porosity of 72% to 99%, wherein the pores of the ceramic porous body are continuous pores with a pore diameter of 10 μm to 300 μm and a pore shape with a mean aspect ratio of at least 1.5, and said ceramic porous body has no closed pores and no pores with a branching structure (dendrite structure).

14. The ceramic porous body according to claim 13, wherein the ceramic is alumina, zirconia, silicon carbide, silicon nitride, cordierite or hydroxyapatite.

15. A ceramic porous body member which comprises the ceramic porous body defined in claim 13.

16. A ceramic porous body member which comprises the ceramic porous body defined in claim 14.

* * * * *